US005619621A

United States Patent [19]
Puckett

[11] Patent Number: 5,619,621
[45] Date of Patent: Apr. 8, 1997

[54] DIAGNOSTIC EXPERT SYSTEM FOR HIERARCHICALLY DECOMPOSED KNOWLEDGE DOMAINS

[75] Inventor: Timothy L. Puckett, Thornton, Colo.

[73] Assignee: Storage Technology Corporation, Louisville, Colo.

[21] Appl. No.: 275,499

[22] Filed: Jul. 15, 1994

[51] Int. Cl.⁶ .................................................. G06F 17/00
[52] U.S. Cl. ................................. 395/51; 395/50; 395/60
[58] Field of Search ........................... 395/50–54, 60–61, 395/65, 75, 76, 77

[56] References Cited

U.S. PATENT DOCUMENTS

| | | | |
|---|---|---|---|
| 4,591,983 | 5/1986 | Bennett et al. | 364/403 |
| 4,649,515 | 3/1987 | Thompson et al. | 364/900 |
| 4,866,635 | 9/1989 | Kahn et al. | 364/513 |
| 5,107,497 | 4/1992 | Lirov et al. | 371/15.1 |
| 5,119,470 | 6/1992 | Highland et al. | 395/64 |
| 5,127,006 | 6/1992 | Subramanian et al. | 371/16.1 |
| 5,222,030 | 6/1993 | Dangelo et al. | 364/489 |
| 5,448,722 | 9/1995 | Lynne et al. | 395/650 |

OTHER PUBLICATIONS

Lautala, Pentti and Yrjo Majanne. "Hierarchy—A Solution for Problems to Apply Model Based Diagnostic Systems in Process Industry." Systems, Man, and Cybernetics, 1993 International Conference. Oct. 17, 1993.

Davis, James F. et al. "Knowledge–Based Diagnostic Systems for Avionics". IEEE Autotestcon '92. Sep. 21, 1992.

Green, M.B. and P.R. Sims. "An Adaptable Expert Aid to Fault Diagnosis in Satellite Communication Networks" Information Decision Action Systems. Apr. 6, 1992.

V.E. Barker & D.E. O'Connor, "Expert Systems for Configuration at Digital: Xcon and Beyond," *Communications of the ACM*, Mar. 1989, vol. 32, No. 3, pp. 298–318.

J. McDermott, "R1: A Rule–Based Configurer of Computer Systems," *Artificial Intelligence*, 1982, pp. 39–88.

J. McDermott, "XSEL: A Computer Sales Person's Assistant," Carnegie–Mellon Univ., Pittsburgh, pp. 325–336.

A.K. Joshi, "Some Extensions of a System for Inference on Partial Information," Copyright 1978 by Academic Press, Inc., pp. 241–257.

*Primary Examiner*—Tariq R. Hafiz
*Attorney, Agent, or Firm*—Sheridan Ross P.C.

[57] ABSTRACT

A forward chaining expert system is disclosed for use in analyzing categorization problems such as in diagnosing device malfunctions. The expert system is particularly useful in diagnosing malfunctions in a knowledge domain having a hierarchical functional decomposition. In such a knowledge domain, the hierarchical decomposition is used in constructing a collection hierarchically related rule sets which constitute the rule base for the expert system. The novel inferencing engine of the expert system iteratively examines rules within a selected rule set and: (a) determines the veracity of rule premises when compared with data within a fact base and (b) examines any statuses returned from the performance of rule consequents. Thus, upon encountering a rule consequent returning success, the inferencing engine selects a new rule set at a lower level in the rule set hierarchy and applies the new rule set to the data retained in the fact base. By allowing the inferencing engine to iteratively select one or more rule sets from a partially ordered collection of rule sets whereby the partial order is related to the knowledge domain hierarchical decomposition, the inferencing engine is able to provide problem solutions in increasingly greater detail when selecting increasingly more specific rule sets. Thus, the inferencing engine need not backtrack to examine alternative solutions.

22 Claims, 7 Drawing Sheets

FIG. 1

RULE SET A

LEVEL 0 — — — — — — — — — — — — — — — — — — —

RULE SET $B_1$    RULE SET $B_2$    RULE SET $B_{18}$

LEVEL 1 — — — — — — — — — — — — — — — — — — —

RULE SET $C_1$    RULE SET $C_2$    RULE SET $C_3$    RULE SET $C_4$    RULE SET $C_5$

LEVEL 2 — — — — — — — — — — — — — — — — — — —

RULE SET $D_{i1}$    RULE SET $D_{i2}$    RULE SET $D_{i3}$

LEVEL 3 — — — — — — — — — — — — — — — — — — —

DIAGNOSTIC EXPERT SYSTEM FOR HIERARCHICALLY DECOMPOSED KNOWLEDGE DOMAINS

FIELD OF THE INVENTION

The present invention relates to expert computational systems and, in particular, to expert systems for diagnosing faults within devices having a hierarchical functional decomposition.

BACKGROUND OF THE INVENTION

In complex devices having a large number of modules and submodules, a failure can be difficult to diagnose. In complex electronic and electromechanical devices sensors are incorporated for outputting data related to the performance of such a device. However, it is not uncommon for such sensors to output data in a plurality of low level cryptic formats such that given the large volume of data typically captured during device operation, a diagnosis of a malfunction is nearly humanly impossible except perhaps for a small number of experts whose time is in increasingly greater demand. Such experts are able to interpret the low level sensor data, to use their interpretations to progressively determine a more detailed understanding of a malfunction, and, decide when to terminate searching for yet a more detailed diagnosis. Further, if the data output from device sensors is such that it can be organized according to an appropriate module/submodule hierarchy of the device, then in many cases an expert can readily diagnose a device malfunction with little, if any, backtracking from exploring one or more incorrect diagnosis hypotheses.

Thus, for example, if the diagnostic data for an automated archival data storage device is organized according to an module/submodule hierarchy where, for instance, there are module/submodule decompositions for: (a) modules for controlling data transfers between one or more data repositories and input/output devices, and (b) modules for physically moving data storage media units (e.g., tape cartridges) between the data repositories and the input/output devices, then an expert for such a data storage device can typically readily determine which of the two hierarchies to explore in diagnosing a malfunction. Further, such an expert will likely quickly determine a diagnosis to the level of detail supported in the data.

Given the above observations and the high demand for such experts, artificially intelligent software systems known as expert systems have been developed to automatically provide much of the expertise that formerly required a human expert. Such systems typically include at least three components: a rule base having rules embodying the knowledge an expert uses in solving a problem, a fact base having data related to the specific problem at hand which is to be solved, and an inference engine which selects pertinent rules from the rule base to apply to the problem given the current facts in the fact base. An expert system for diagnosing malfunctions in complex devices having a module/submodule hierarchical organization or decomposition is therefore worthwhile to provide. In particular, it is worthwhile to provide an expert system for diagnosing faults of a device having a module/submodule hierarchical organization wherein the expert system makes use of the hierarchical organization to efficiently and cost effectively provide fault diagnosis.

SUMMARY OF THE INVENTION

The present invention relates to a method and apparatus for inferring a diagnosis of a computation system fault. More precisely, the present invention provides a novel expert system for efficiently and effectively diagnosing a fault within a computational system. In one aspect of the invention, the novel expert system includes an inference engine having a forward chaining architecture designed for use with a rule base comprising a hierarchical (i.e., partially ordered) collection of rule sets such that fault diagnosis commences by processing a "root rule set" (i.e., a rule set having no parent rule set in the hierarchy) and progressively navigating a path down through the hierarchy until an appropriate diagnosis is obtained. Thus, rule sets are processed by the novel inference engine in a manner such that as rule sets further down the hierarchy are used in inferencing, a progressively more specific fault diagnosis is determined.

In addition to the novel inference engine, it is a further aspect of the present invention that it provides a method for creating such a hierarchical rule base such that fault diagnosis may be obtained without back-tracking through the hierarchy of rule sets. Thus, the present invention can be used in diagnosing a fault by inferencing using rule sets on a single path down the rule set hierarchy, visiting the rule sets at a given level only once and examining only those rule sets at each level that are pertinent to diagnosing the fault at hand.

It is a further aspect of the present invention that the method for creating a hierarchical rule base includes a step of determining a hierarchical decomposition of the functional modules or components of a computational system to be diagnosed. In determining this hierarchical decomposition of the computational system, preferably, related modules or components in the hierarchy are related by the relation: "provides a subfunction of." Thus, if the computational system includes a robotic arm having a mechanical hand subassembly, then the mechanical hand subassembly "provides a subfunction of" the robotic arm. Subsequently, the method for creating a hierarchical rule base includes a step of providing a different diagnostic rule set for substantially ever functional component within the hierarchical decomposition of the computational system being diagnosed. Thus, the rule set hierarchy substantially mirrors the hierarchical decomposition of the computational system to be diagnosed thereby allowing fault diagnosis by the processing of a path of rule sets down the rule set hierarchy in a manner analogous to that of an expert technician.

It is a further aspect of the present invention that each rule within the rule sets is an "if-then" rule where during processing:

(1.1) the "if" portion or rule premise is examined to determine whether the premise is satisfied by (i.e., matches) a currently active collection of facts within a fact base included within the expert system of the present invention; and (1.2) the "then" portion or rule consequent is performed when the premise of a rule is satisfied and further the rule consequent returns a status indicating whether the consequent performed successfully or not, the status being used by the inference engine of the present invention to determine whether to proceed to another rule set further down the rule set hierarchy.

It is a further aspect of the present invention that when the present invention is applied to diagnosing a computational system fault by analyzing an error log, that the consequent of substantially each rule not in a terminal rule set (i.e., rule sets with no children rule sets in the rule set hierarchy) has an error log query included within its consequent. Such a query is used for searching the error log in order to retrieve data indicating a predetermined fault type. Thus, a successful return status of such a rule consequent substantially depends upon the success of the query embedded within the consequent in retrieving the requested fault data.

It is a further aspect of the present invention that when no diagnosis can be determined, the expert system of the present invention outputs data or facts from the fact base providing information about the fault even though no diagnosis may be obtained. It is worthwhile mentioning in this context that the information output is also useful in determining how to enhance the rule base such that the fault may be in the future diagnosed correctly.

From the foregoing description, it can be seen that it is an advantage of the present invention to provide an expert system having an inferencing engine of simple forward chaining architecture not requiring backward chaining or back tracking.

It is a further advantage of the present invention to provide a simple method for creating a robust and maintainable diagnostic rule base.

It is a further advantage of the present invention to provide a cost-effective capability for analyzing error logs of complex computational systems, such as mass data storage tape devices, where the error log can be large, cryptic and complex and further, where a plurality of fault symptoms can be the result of a single fault.

Other features and benefits of the present invention will become apparent from the Detailed Description and the accompanying figures contained hereinafter.

DETAILED DESCRIPTION

Figure 1:
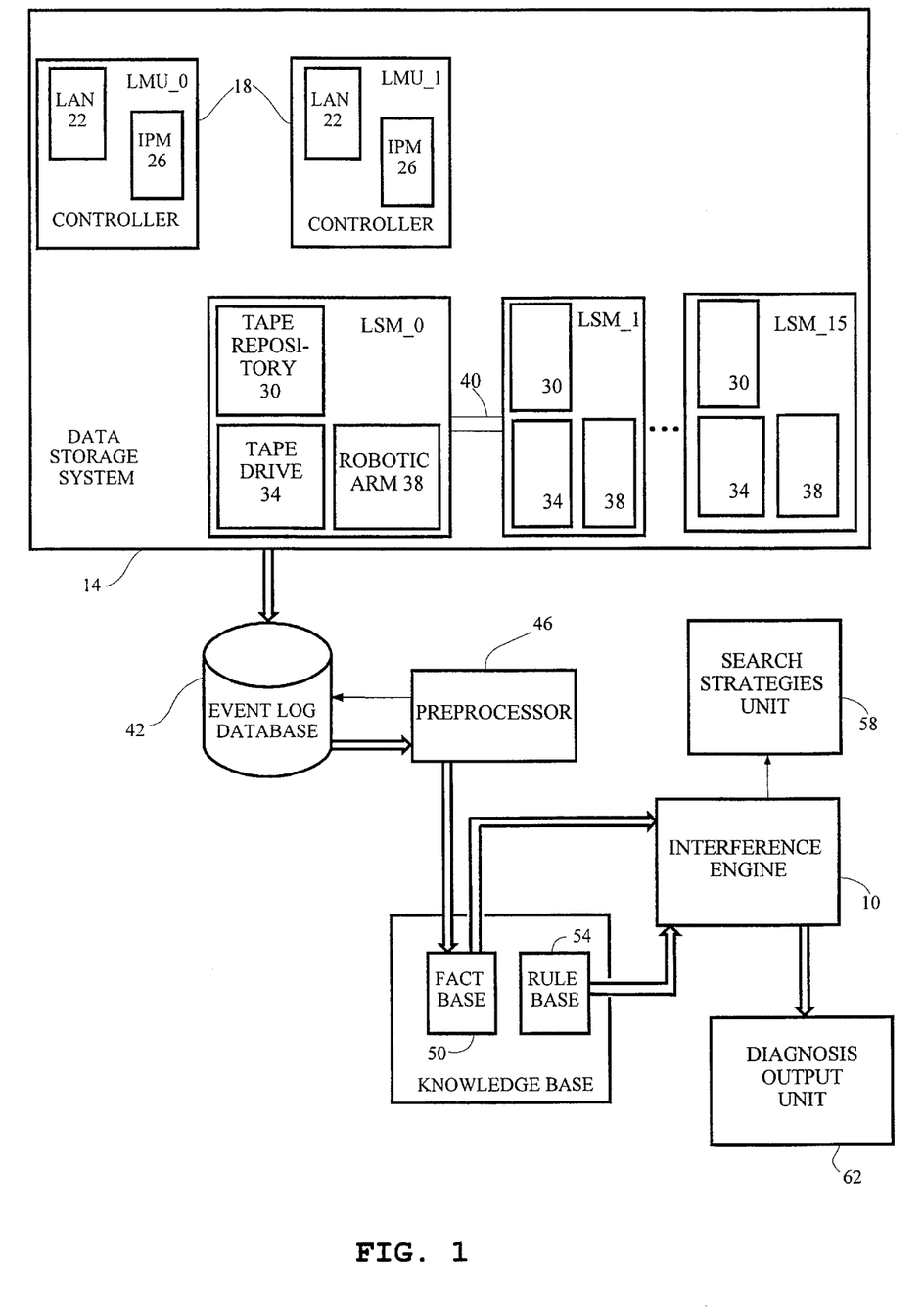
FIG. 1 is a block diagram illustrating the present invention in the context of an expert system for diagnosing malfunctions of an archival data storage system.

The expert system of the present invention can be used in various contexts including the diagnosis and/or configuration of electronic or electromechanical equipment. In particular, the present invention has been embodied in a system for diagnosing malfunctions within an automated archival data storage system having robotic capabilities where the data is stored on a plurality of cataloged cartridge magnetic tapes. Thus, FIG. 1 represents a block diagram of the present invention used in the context of diagnosing such an automated archival data storage system 14. Note that the double lined arrows of FIG. 1 indicate data flows between blocks and the single lined arrows indicate control flows. Thus, the double lined arrows denote the transfer of diagnostic data and/or expert system rules related to diagnosing faults of the system 14, while the single lined arrows indicate the direction of the flow of control and related control data.

The data storage system 14 includes a pair of data transfer controllers 18, denoted LMU_0 and LMU_1, for controlling the transfer of data within the data storage system 14. Each of the data transfer controllers 18 includes sensors (not shown) for providing data relating to the overall performance or diagnosis of each of the controllers 18. Furthermore, each of the controllers 18 are capable of sending commands to the robotic features of the data storage system 14, receiving sensor data from various sensors located throughout the data storage system 14, recording sensor responses in an error log and providing status information to any host computer (not shown) to which the controllers are connected. Additionally, within each controller 18 there are at least two submodules 22 and 26 each having sensors (not shown) for providing diagnostic data relating to their respective performances. Regarding submodule 22 LAN, this component provides local area networking capabilities for the data storage system 14. Regarding the IPM (Interface Protocol Module) submodule 26, this component provides communications between the controller and a host computer (not shown). In addition, the data storage system 14 includes up to 16 library storage modules, denoted LSM_0 through LSM_15 where each LSM is used for storing and retrieving tape data cartridges. Further note that as with the controllers 18, there are sensors (not shown) associated with each LSM for outputting diagnostic data. Each LSM, in turn, includes a cataloged tape cartridge storage repository submodule 30, a tape drive submodule 34 and a robotic arm submodule 38 such that the robotic arm submodule 38 performs the following functions:

(2.0) fetches a predetermined tape cartridge from the repository submodule 30 and places it in a tape drive of the tape drive submodule 34;

(2.1) fetches a tape cartridge from the repository submodule 30 and transfers it to a user access area (not shown);

(2.2) retrieves a tape cartridge from a tape drive of the tape drive module 34 and returns the cartridge to the appropriate location within the repository submodule 30;

(2.3) retrieves a tape cartridge from a user access area and returns the cartridge to the appropriate location within the repository submodule 30;

(2.4) fetches a tape cartridge from the repository submodule 30 and places it in an LSM pass-through port 40 for passing cartridges between LSM's;

(2.5) retrieves a tape cartridge from an LSM pass-through port 40.

The sensors associated with the module/submodule component hierarchy of the data storage system 14 provide their output to an event log database 42. This database stores the data substantially sequentially according to the time the data is received. The diagnostic data captured in the event log database 42 is provided to a preprocessor 46 as a result of a preprocessor 46 query of the event log database. The preprocessor 46 transforms the low level time dependent sensor output data satisfying the query into high level facts which are substantially time independent. The preprocessor 46, in turn, outputs the high level facts to a knowledge base 48 more precisely to a fact base 50. The facts residing in the fact base 50 are supplied to the inference engine 10 of the present invention. The facts are used by the inference engine 10 for:

(3.1) determining if the premise of one or more expert system "premise-consequent" (i.e., if-then) rules relating to a data storage system 14 malfunction diagnosis evaluates to true; and (3.2) performing the action related to the consequent(s) for the rule(s) whose premise(s) evaluate to true in (3.1).

Thus, in addition to the facts, the inference engine 10 also receives rules from the rule base 54 to be used in (3.1) and (3.2) above.

When further facts are required by the inference engine 10, the search strategies unit 58 is invoked to translate a high level search query so that the event log database 42 may be properly searched via the preprocessor 46. Alternatively, when it is determined that no further detailed diagnosis can be obtained, the inference engine 10 outputs the current state of a diagnosis to the diagnosis output unit 62 (e.g. a file or report generator). Thus, the inference engine 10 receives high level facts from the fact base 50 and after examining a pertinent set of rules either terminates the diagnosis process and provides the current state of the diagnosis to the output unit 62, or determines that further more detailed data should be requested from the event log database 42 via the search strategies unit 58 and the preprocessor 46.

The rule base 54 is structured such that its rules are partitioned into "rule sets," each rule set having one or more rules. Further, the rule sets are organized hierarchically in a manner relating to the module/submodule functional decomposition hierarchy of the data storage system 14. Thus, diagnostic rules related to the overall performance of the higher level modules are contained in the higher level rule sets and the lower level rule sets contain rules related to the performance of lower level submodules. More precisely, referring to FIG. 2, a hierarchy of rule sets is presented having four levels 0 through 3 with level 0 being the highest.

Figure 2:
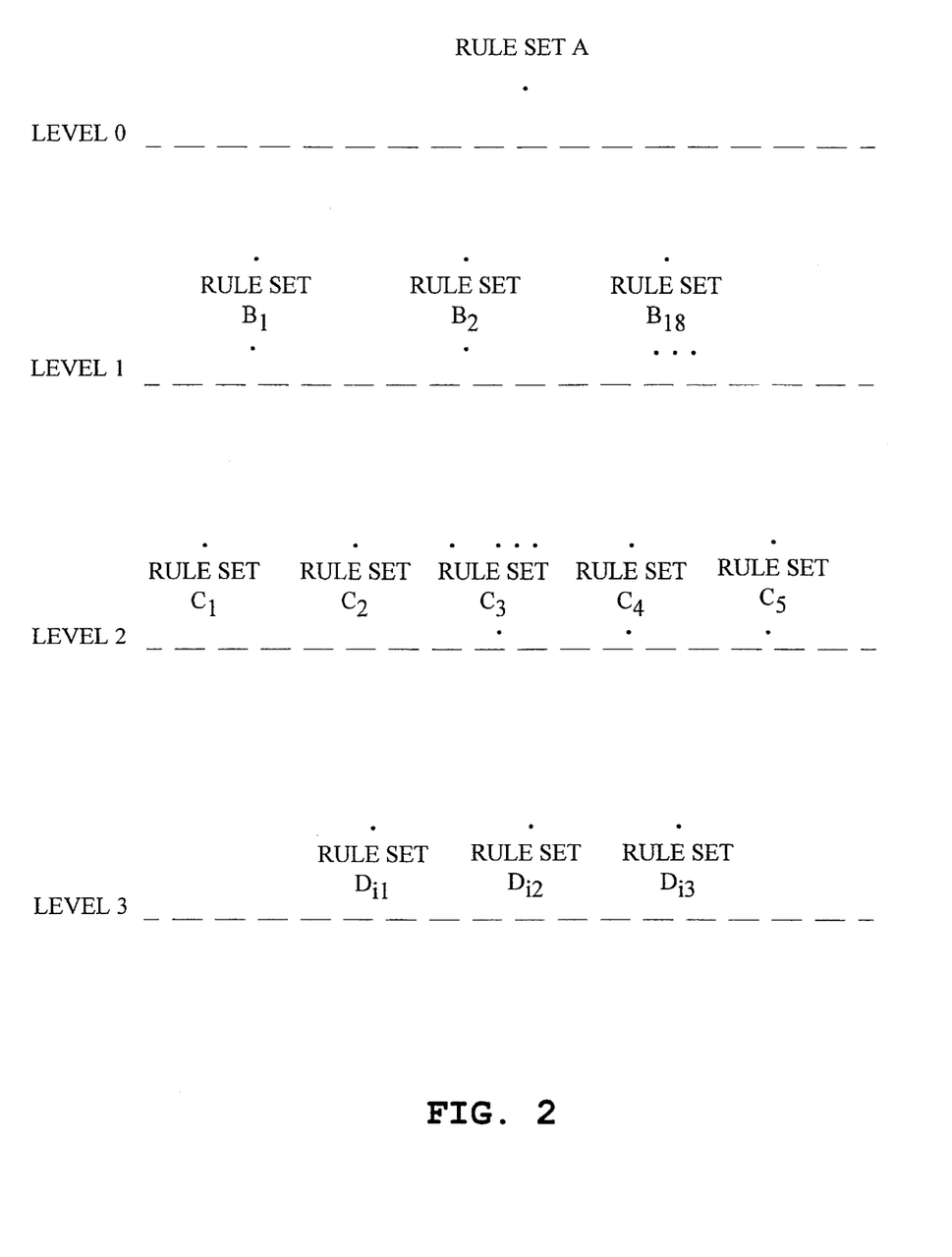
FIG. 2 is an illustration of a hierarchical organization of rule sets using the inference engine 10 of the present invention.

In the present embodiment, rule set A of FIG. 2 includes rules for determining which (if any) of the highest level modules of the data storage system 14 have malfunctioned. The next level of rule sets, i.e., level 1 rule sets, include rules for diagnosing, at a high level, a malfunction detected in one of the high level modules of the data storage system 14. More precisely, level 1 includes, for each of the modules: the controllers LMU_0, LMU_1, and the library storage modules LSM_0 through LSM_15, a rule set $B_k$ for diagnosing malfunctions of each module, respectively.

The next level of rule sets, i.e., level 2 rule sets, are the rule sets corresponding to the next level of submodules in the data storage system 14 below the modules related to the rule sets of level 1. For example, there are rule sets for (a) diagnosing malfunctioning mechanisms within an LSM such as an inoperative robot arm, and (b) determining the cause of such a malfunction. In addition, such malfunctions may be categorized to indicate the severity of the failures.

Still referring to FIG. 2, the rule sets of level 3 are directed to yet a more detailed analysis of data storage system 14 malfunctions. For example, at this level there are rule sets for providing a more detailed determination of a failure, describing what the cause of the failure is and providing a prescription for correction of the failure.

Figure 3:
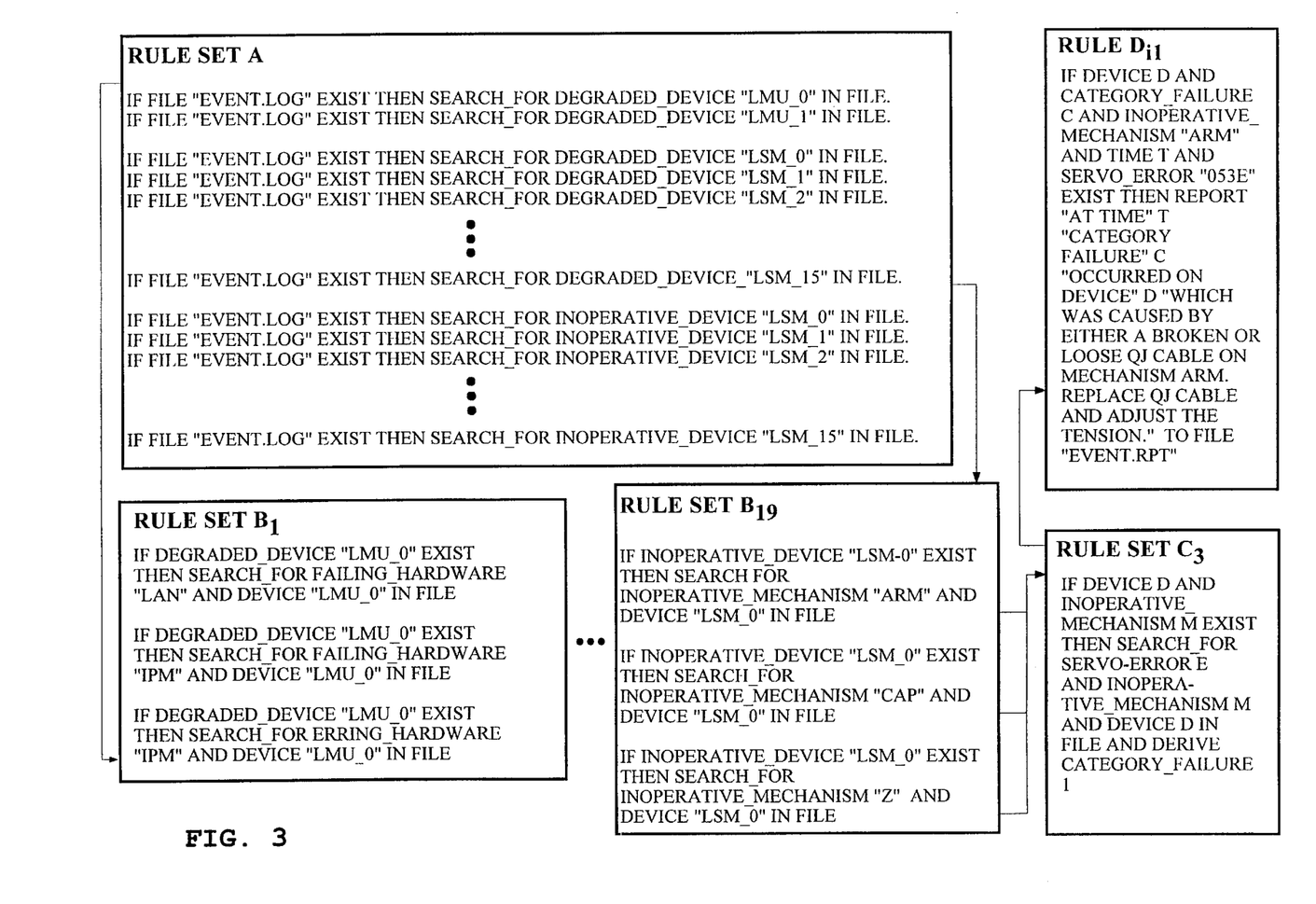
FIG. 3 is a more detailed illustration of a portion of the hierarchy of FIG. 2 where the rules within some of the rule sets are specified.

Referring now to FIG. 3, examples are given of the rules in a number of rule sets represented in FIG. 2. It is important to note that for each rule set, the rules within the rule set apply to the same functional component or module within a hierarchical decomposition of the computational system being diagnosed. Thus, in general, by determining the parameters to examine for a given functional component, it has been determined that the premise of each rule within a given rule set may be structured substantially the same by providing a template premise having, for each such parameter, a parameter related predicate or condition within the template premise such that an instantiation of the template premise in a given rule may provide predetermined values or ranges of these parameters which must be satisfied for the rule premise to be satisfied. Thus, regarding the rule sets of FIG. 3 for the data storage system 14, it should be appreciated that for each rule set, the rule premises for rules within the rule set have substantially identical structure.

The rule sets presented in FIG. 3 will now be discussed in greater detail. Regarding rule set A, this rule set includes rules which test for the existence of an event log data base 42 event log file and if found subsequently searches for an indication of a degraded or inoperative component among the highest level functional components of the data storage system 14. Thus, assuming such an event log file exists, the consequent portion of each rule provides high level instructions for searching the event log file for facts relating to a predetermined malfunction. For example, the first rule of rule set A has a consequent which instructs the search strategies unit 58 to provide a search procedure for investigating whether the event log file contains data indicating that the LMU_0 is degraded; i.e., performing below an acceptable standard (e.g., too many data transfer retries). Similarly, the second rule of rule set A performs the same determination for the second controller 18, LMU_1. In brief, rule set A presently includes three categories of rules: (a) rules for determining if one of the controllers 18 is degraded (i.e., the first two rules); (b) rules for determining if one of the library storage modules, LSM, is degraded; and (c) rules for determining if any of the library storage modules includes an inoperative device.

Note that upon encountering any of these rules or similarly structured rules, it is a feature of the inference engine 10, subsequent to determining the validity of a rule premise, to both perform the rule consequent and examine any status returned by that consequent as will be detailed below with reference to FIGS. 5–7. For example, the consequent of each of the rules in rule set A is capable of returning a success/failure status. Thus, it is a feature of the inference engine 10 to also use any resulting consequent status value in determining whether there is sufficient support in the event log file data to justify a more detailed analysis of a detected malfunction using a lower level rule set related to the rule currently being evaluated. Thus, if an insufficient collection of facts is derived from the event log file, then the inference engine 10 proceeds to examine other rules in the current rule set regarding other high level malfunctions. In particular, if the consequent of the first rule in rule set A returns a failure status, then the second rule in rule set A is similarly evaluated to determine if the controller 18, LMU_1, is degraded. Alternatively, if the consequent of the first rule returns a success status, then the inference engine 10 makes rule set $B_1$ the current rule set. Subsequently, the inference engine 10 commences processing with the first rule of rule set $B_1$ to determine further detail for diagnosing the degraded performance of controller LMU_0.

Alternatively, if the rule set A rule having a 'SEARCH_FOR_INOPERATIVE_DEVICE "LSM_0"' in its consequent is executed successfully, the processing continues with rule set $B_{19}$. Note that upon successful performance of any rule from $B_{19}$, the single rule of rule set $C_3$ is encountered. This rule may be described as a "generalized rule" in that variables must be instantiated before the rule can be evaluated, as will be discussed further with reference to the flowchart of FIG. 7. In particular, variables "D", "M" and "E" must be provided with values. Additionally, note that the consequent of this rule includes the term "DERIVE CATEGORY_FAILURE 1" which asserts the fact "CATEGORY_FAILURE 1" in the fact base 50 to indicate the type of failure being processed. It is worth mentioning that the consequent of substantially any rule may include such fact base assertion terms as a way to enter additional facts in the fact base 50. In this context, note that such fact base assertions only perform unsuccessfully in the rare case that the fact to be asserted cannot be put in the fact base 50.

Figure 4:
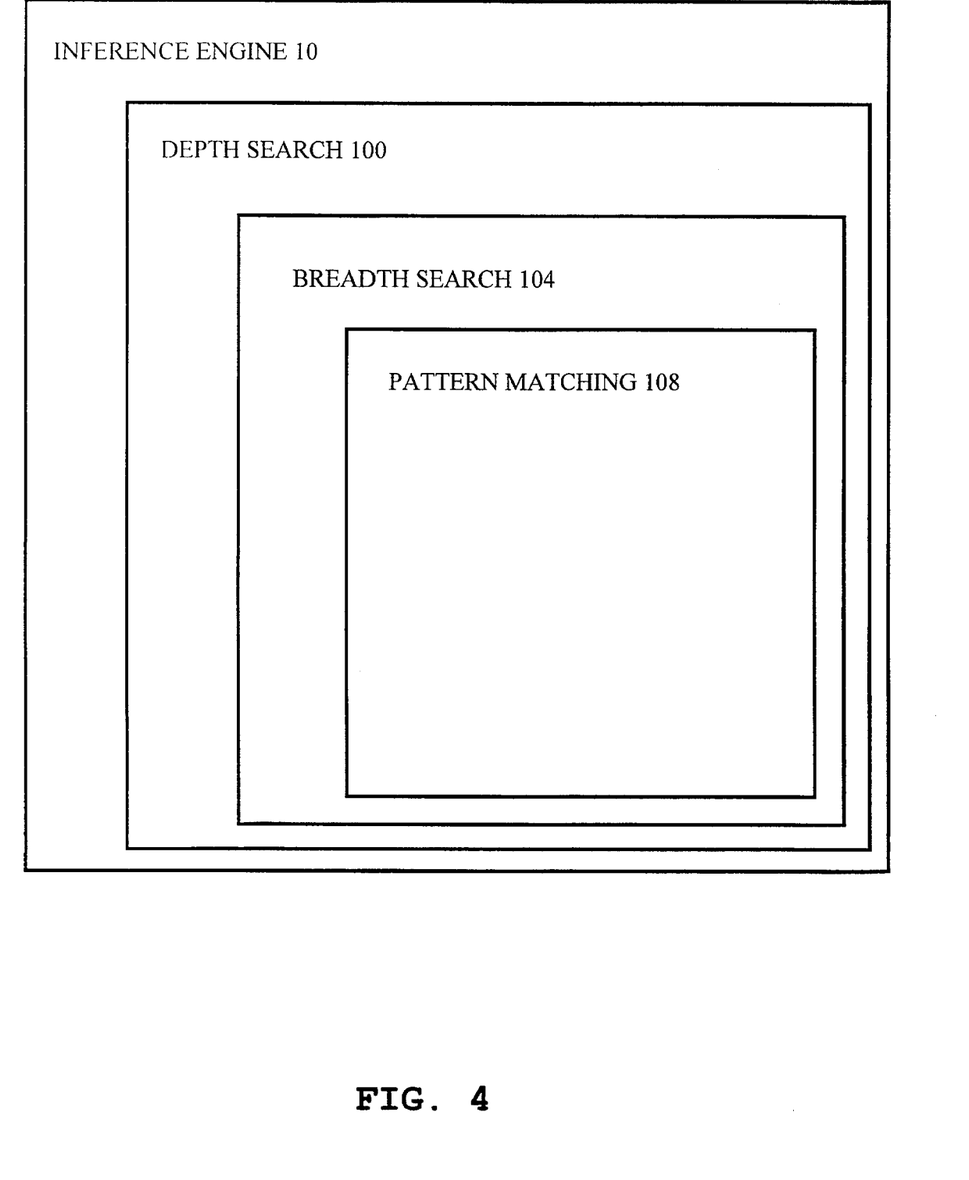
FIG. 4 is a block diagram of the inference engine 10 of the present invention.

In reference to FIG. 4, a high level block diagram of the inference engine 10 of the present invention is provided. Within the inference engine 10 is a depth search module 100 which controls the processing of rule sets as inferencing proceeds down the rule set hierarchy during diagnosing. A high level flow chart describing this module is provided by the flowchart of FIG. 5 discussed below. Within the depth search module 100 is a breadth search module 104 which allows the inference engine 10 to schedule and execute one or more rules within a rule set. A high level flowchart describing the breadth search module 104 is provided by the flowchart of FIG. 6. Within the breadth search module 104 is a pattern matching module 108 which is used for matching the premises of a rule with facts from the fact base 50 to determine which rule(s) is to be scheduled to have its consequent executed. A high level flowchart describing the pattern matching module 108 is provided by the flowchart of FIG. 7 also discussed below.

Figure 5:
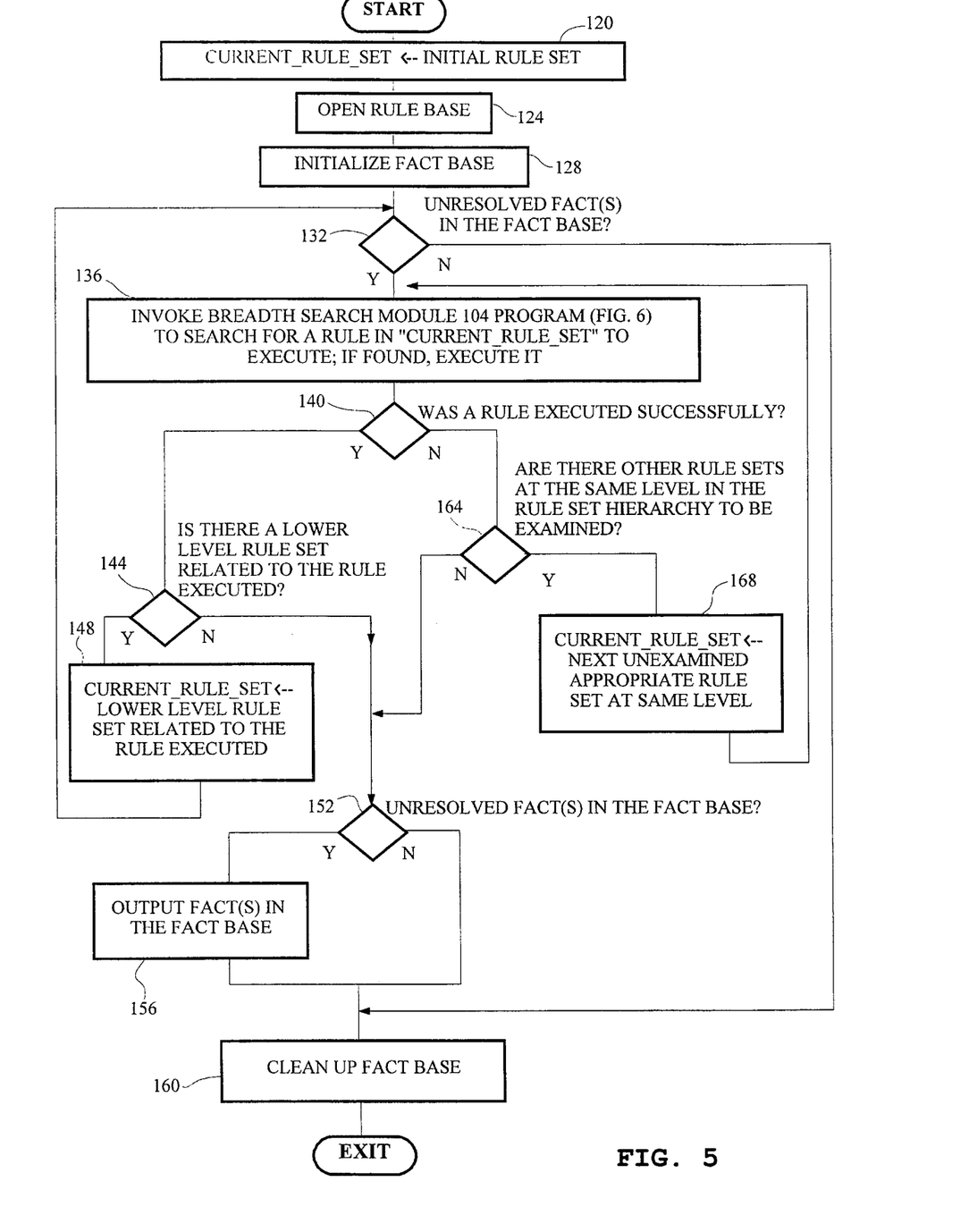
FIG. 5 is a flowchart of the steps performed by the depth search module 100 of the inference engine 10 of the present invention during the inferencing process.

Referring now to FIG. 5, a flowchart describing the operation of the depth search module 100 is presented. In step 120 a root rule set of a rule set hierarchy specific to a given computational system to be diagnosed is determined and assigned to the variable "CURRENT_RULE_SET." Note that electromechanical devices for storing mass quantities of data such as tape and disk libraries are examples of computational systems to be diagnosed. However, to provide greater specificity to the following discussion, the FIGS. 5–7 will be discussed in reference to the embodiment of FIG. 1. In step 124, the rule set hierarchy corresponding to "CURRENT_RULE_SET" is opened, i.e., made accessible to the inference engine 10. In step 128, the fact base 50 is initialized. In accomplishing this initialization, the inference engine 10 sets the fact base 50 to an "initial state" wherein initialization facts are inserted into the fact base. Subsequently, in step 132 the inference engine 10 determines whether there are unresolved facts in the fact base 50. Note that at least one of the facts inserted into the fact base 50 during the initialization step 128 is an unresolved fact. Thus, when first encountered step 132 yields an affirmative result and therefore step 136 is encountered. In step 136 the current rule set is searched, via the breadth search module 104, for a rule whose premise matches facts currently present in the fact base 50 and if such facts are found, then the rule's consequent is executed. Note that the flowchart describing step 136 is provided in FIG. 6. Subsequently, in step 140, a determination is made as to whether a rule was executed successfully. If so, then in step 144 a rule set on the next lower level of the rule set hierarchy is determined which is related to the rule that was executed in step 136. Preferably, each rule set maintains a data structure providing a pairing of each rule of the rule set with any lower level rule set that is to be examined if the rule executes successfully.

Thus, since each rule is provided with an identifier indicating the rule set to which it belongs, the step 144 traces through the necessary data linkages to determine the (any) lower level rule set to which to branch.

Assuming such a lower level rule set exists, in step 148 the related lower level rule set is assigned to "CURRENT_RULE_SET" and subsequently, step 132 is again executed to determine if this new rule set has a rule that executes successfully. Alternately, if no such lower level rule set exists, then in step 152 a determination is made as to whether there are unresolved facts in the fact base. If so, then in step 156 these facts are output so that, for instance, a determination can be made manually as to the type of fault occurring. Further, this output is useful in facilitating adding additional rules to the rule base hierarchy to diagnose presently undiagnosable faults. Regardless, however, of the path taken from step 152, step 160 is encountered wherein the fact base is placed in a "finish" state. Note that in this state all facts in the fact base are deleted and the fact base is subsequently uninitialized. Thereafter, the program of FIG. 5 exits.

Referring again to step 140, if no rule successfully executed in step 136, then in step 164 a determination is made as to whether there are other rule sets at the same level in the rule set hierarchy which are to be examined. Note that it is not normally necessary that all rule sets at a given level be examined. In particular, if in processing a fault, a parent rule set containing a rule that successfully executed which led to the rule set presently identified by "CURRENT$_{13}$RULE$_{13}$SET" also has one or more rules, each of which is paired with another rule set at the same level as the current rule set, then it is sufficient to examine each of these other paired rule sets. The reasoning for this is that these other paired rule sets are exactly those which are also related to the fault being diagnosed in that each of these rule sets provide a more detailed diagnosis of the type(s) of fault(s) which are processed by the above mentioned parent rule set. Therefore, since the parent rule set was encountered during diagnosis and a rule successfully executed in the parent rule set and further, that the other rules in the parent are related to similar fault diagnosis, it has thus been determined that any additional rule sets at the current level that are paired with these other rules in the parent rule set are exactly the appropriate rule sets to be examined.

Assuming that the positive branch from step 164 is taken, then in step 168 the variable "CURRENT_RULE_SET" is assigned the next unexamined appropriate rule set at the same level as the rule set currently assigned to "CURRENT_RULE_SET" wherein the appropriateness of the unexamined rule set is in the sense of the immediately preceding paragraph. Subsequently, step 136 is again encountered so that successful execution of a rule within this new current rule set is attempted.

Alternatively, if in step 164 there are no further rule sets at the current level to be examined, then the flow of control transfers to step 152 for cleaning up of the fact base 50 prior to exiting and possibly outputting any facts remaining in the fact base.

Figure 6:
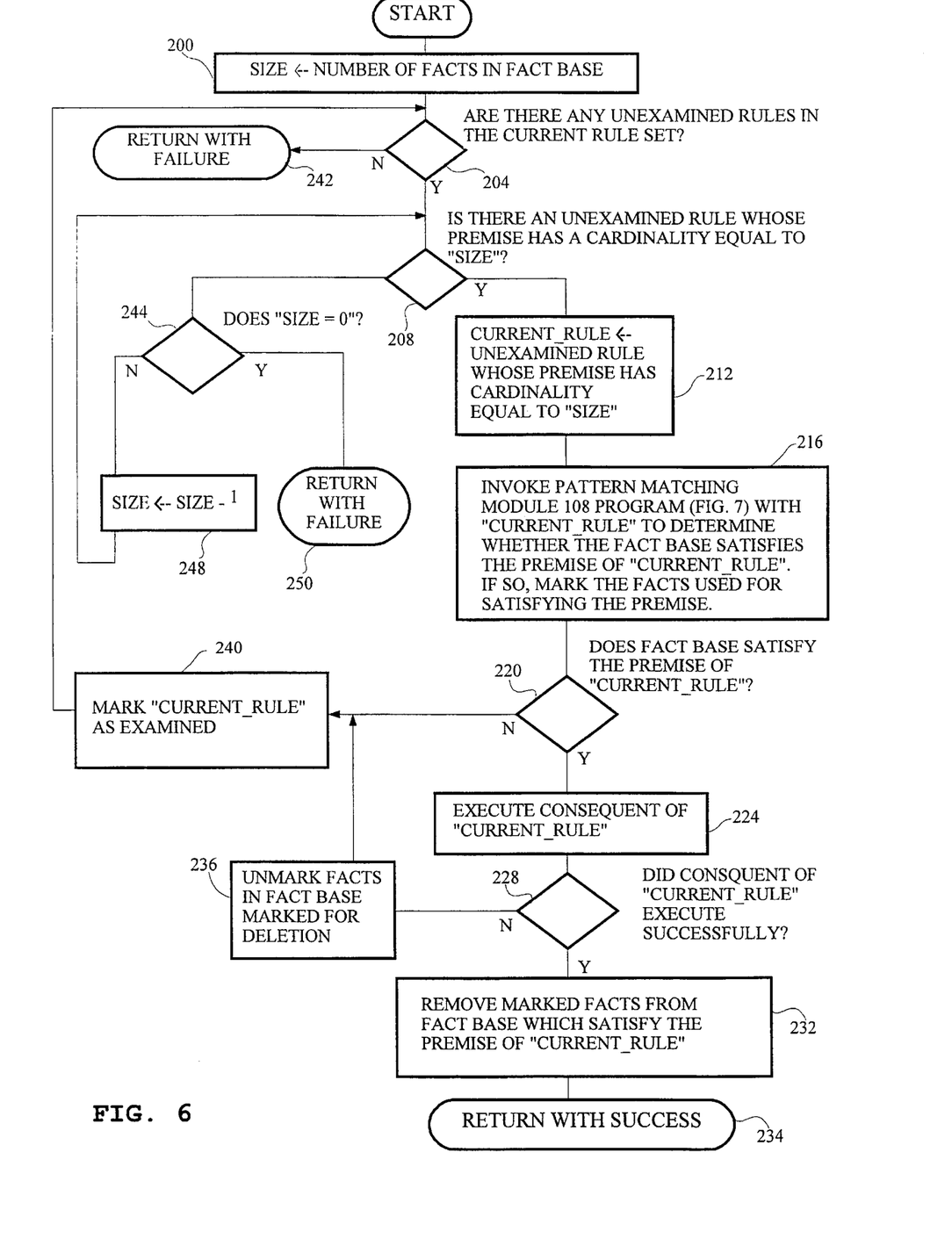
FIG. 6 is a flowchart of the steps performed by the breadth search module 104 of the inference engine 10 when selecting a rule from a rule set to apply to the data currently residing in the fact base 50.

In FIG. 6, a high level flowchart is presented of the breadth search module 104 which is invoked in step 136 of FIG. 5. It is worthwhile noting that the rule set assigned to "CURRENT_RULE_SET" of FIG. 5 is provided as input to the flowchart of FIG. 6. In discussing the steps of FIG. 6, reference is first made to step 200 where the variable "SIZE" is assigned a number corresponding to the number of facts in the fact base 50. In step 204, a determination is made as to whether there are any unexamined rules in the current rule set (the rule set being initially input from FIG. 5). If there is at least one unexamined rule, then in step 208 a determination is made as to whether such an unexamined rule has a premise which has a cardinality (i.e., the number of predicates or conditions within the premise) equal to the value of the variable "SIZE." Note that during the first encounter of step 208 within an invocation of FIG. 6, this step performs a search for a rule that has as many conditions in its premise as there are facts in the fact base 50. Further note it has been determined that since:

(a) substantially every condition to be satisfied within a premise requires a matching with at least one fact in the fact base; and (b) each such condition is satisfied only by matching a different fact in the fact base, that an expedient method of choosing a rule is to first choose rules which are the most specific. That is, rules are first chosen whose premise requires a larger number of facts to be satisfied. Note that in the present embodiment of the invention, no rules have been required which have a number of premise conditions greater than the initial value of "SIZE." In other embodiments, where this constraint is not applicable, the variable "SIZE" may be initialized to alternative values such as the number of conditions in a rule premise having the largest number of conditions.

Assuming a rule in the current rule set is found having a premise with a cardinality (i.e., the number of conditions) equal to "SIZE," then in step 212 such a rule is assigned to the variable "CURRENT$_{13}$RULE" as the current rule. Subsequently, in step 216 the pattern matching module 108 is invoked to determine if the current rule has a premise satisfied by the facts currently residing in the fact base 50. Further, as will be discussed regarding FIG. 7, the facts of the fact base 50 used in satisfying the premise of the current rule are marked or tagged for detection from the fact base. Consequently, in step 220 a returned status value from step 216 is checked to determine whether the premise of the current rule is satisfied. If so, then in step 224 the consequent or "then" portion of the current rule is executed. Subsequently, since in the present invention each rule returns a status indicating the success or failure of the execution of the rule's consequent, in step 228 a determination is made as to whether the consequent of the current rule executed successfully. Note that when the present invention is used in diagnosing faults of an electromechanical mass data storage device such consequents may include one or more queries of an error log and in this context, successful execution of the consequent implies that such queries have found error log data satisfying the queries. Thus, if step 228 yields an affirmative result, then in step 232 the marked facts which satisfy the premise of the current rule are removed from the fact base 50 thereby decreasing the size of the fact base such that processing of premises of other rules lower in the rule set hierarchy are not needlessly slowed down by superfluous facts in the fact base. Subsequently, in step 234, the program of FIG. 6 returns with success to step 136 of FIG. 5.

Having discussed the main path of steps through FIG. 6, the alternative paths will now be discussed. Referring first to step 228, if the consequent of the current rule did not execute successfully, then in steps 236 and 240 the facts marked for deletion are unmarked and the current rule is marked as examined, respectively. Thus, subsequently step 204 is again encountered to determine if there is another rule from the current rule set to be examined. Note that if, in executing step 204 there are no further rules in the current rule set, then the breadth search module 104 returns with failure in step 242.

Referring now to step 220 again, if the fact base 50 does not satisfy the premise of the current rule, then as above, the current rule is marked as examined (step 240) and control is again transferred to step 204.

Referring now to step 208, if there is not an unexamined rule having a premises with a cardinality equal to "SIZE," then in step 244 "SIZE" is tested for being equal to zero. If "SIZE" is not equal to zero, then in step 248 "SIZE" is decremented so that step 208 is again encountered wherein rules with a premises having a cardinality equal to the new value of size are examined. However, if "SIZE" is zero in step 244, then this implies that all rules within the current rule set, including those with a no or null premise have been examined. Thus, in step 250, FIG. 6 returns to step 136 of FIG. 5 with failure.

Figure 7:
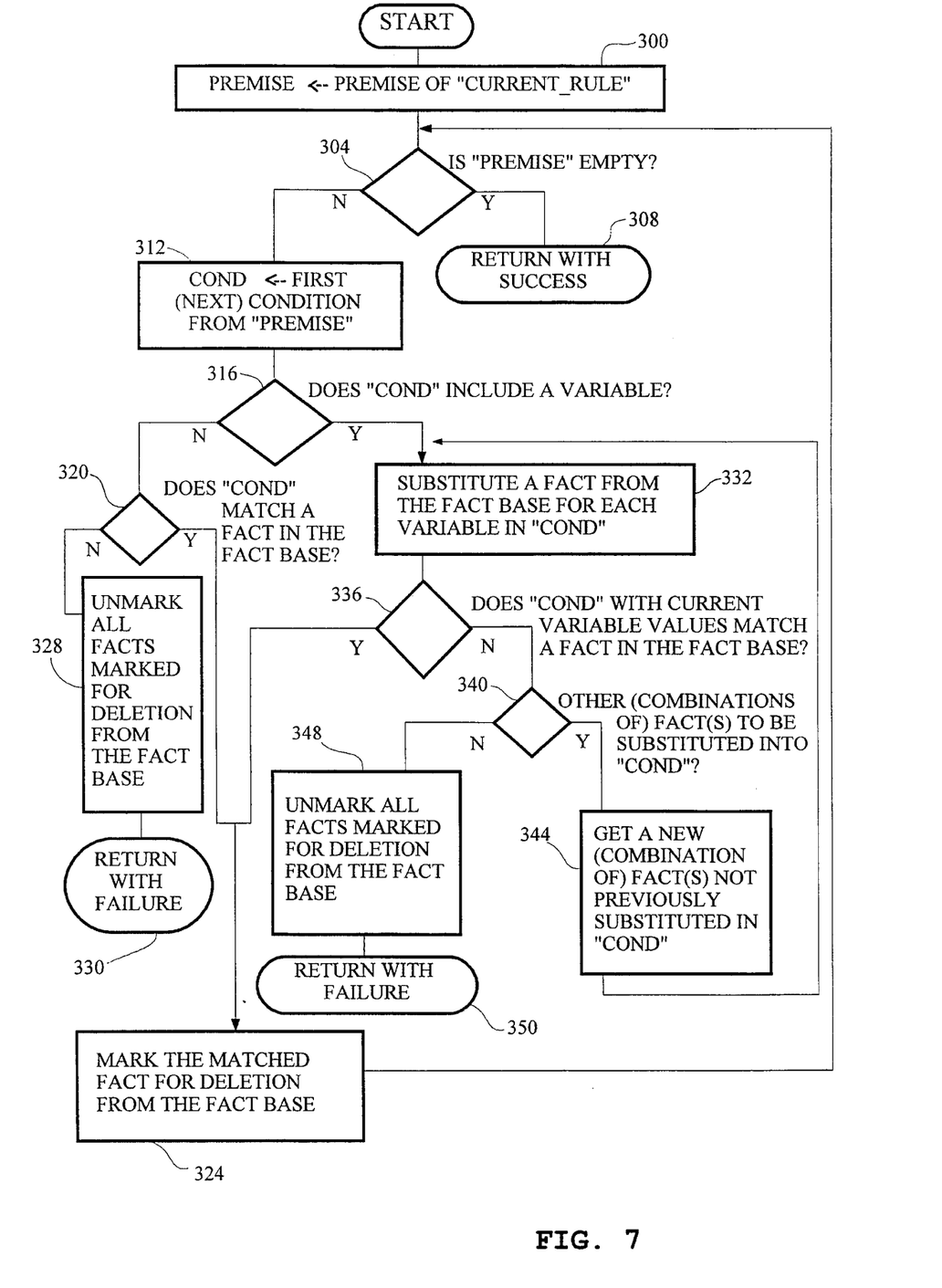
FIG. 7 is a flow chart of the steps performed by the pattern matching module 108 of the inferencing engine 10 when determining whether the premise of a rule is satisfied by the facts currently residing in the fact base 50.

Referring now to the flowchart of FIG. 7 describing the pattern matching module 108, in step 300 the variable "PREMISE" is assigned (a reference to) the data structure corresponding to the premise of the current rule, the current rule being an input parameter to FIG. 7 when it is invoked from step 216 of FIG. 6. In step 304 a determination is made as to whether "PREMISE" is empty. That is, the premise is tested to determine if it has no conditions within it. If so, then the premise of the current rule is automatically satisfied. Thus, in step 308 control is returned with success to step 216 of FIG. 6. Alternatively, if "PREMISE" is not empty, then in step 312 the variable "COND" is assigned the first condition within "PREMISE" and this condition is removed from "PREMISE." In step 316, a determination is made as to whether the value of "COND" includes a variable. Note, that conditions within a premise can be either a term which must match a specific fact within the fact base 50 or a term having variables or unknowns which can match one or more facts in the fact base 50 depending on the values given the variables. That is, in the latter case, a fact in the fact base which is identical to the term except for values instantiating the variable(s) within the term matches or satisfies the term. If "COND" does not include a variable, then in step 320 a determination is made as to whether there is a fact in the fact base which matches (i.e., is identical to) "COND." If so, then in step 324 the matching fact is marked for deletion from the fact base 50 and control passes to step 304 again to determine if there are additional conditions within the variable "PREMISE" to be evaluated. Alternatively, if in step 320, "COND" does not match a fact in the fact base 50, then the premise of the current rule cannot be satisfied. Thus, in step 328 any facts that have been marked for deletion due to satisfying some portion of the premise of the current rule are now unmarked so that they will not be removed. Subsequently, in step 330 since the premise of the current rule could not be satisfied, the pattern matching module 108 returns with failure.

Returning to step 316 again, if "COND" includes one or more variables, then in step 332 a fact from the fact base 50 is provided for each variable in "COND." Subsequently, in step 336, a determination is made as to whether "COND" with the current values for its variables match a fact within the fact base 50. If so, then step 324 is again encountered and the fact matched is marked for deletion prior to control being again transferred to step 304. Alternatively, if in step 336, "COND" with current variable values, does not match a fact in the fact base 50, then in step 340 a determination is made as to whether there are other combinations of facts to be substituted for the variable(s) of "COND." If this is the case, then in step 344 a new combination of facts is determined and control subsequently is transferred to step 332 wherein the new combination of facts obtained in step 344 is substituted into "COND" to determine if this new version of "COND" matches a fact in the fact base 50. Alternatively, if the result from step 340 is negative (i.e., all combinations of facts have been used in "COND"), then the present condition cannot be matched. Therefore, the premise of the current rule cannot be satisfied. Thus, in step 348 all facts marked for deletion are unmarked and subsequently in step 350 control returns to step 216 of FIG. 6 with failure.

Finally, note that if the loop of steps 304 through 350 eventually matches every condition originally contained in "PREMISE," then "PREMISE" will become empty and step 304 will evaluate affirmatively such that success is returned in step 308.

The foregoing discussion of the invention has been presented for purposes of illustration and description. Further, the description is not intended to limit the invention to the form disclosed herein. Consequently, variation and modification commensurate with the above teachings, within the skill and knowledge of the relevant art, are within the scope of the present invention. The embodiment described hereinabove is further intended to explain the best mode presently known of practicing the invention and to enable others skilled in the art to utilize the invention as such, or in other embodiments, and with the various modifications required by their particular application or uses of the invention. It is intended that the appended claims be construed to include alternative embodiments to the extent permitted by the prior art.

What is claimed is:

1. A method for analyzing data comprising:

establishing a hierarchical decomposition of a device into a plurality of components, each of the components outputting diagnostic data items, said hierarchical decomposition including a plurality of levels of said components of the device with each lower level component having a related higher level component such that a lower level component provides a functional capability of its related higher level component;

storing in storage means a rule set hierarchy having a plurality of rule sets, said rule set hierarchy having a hierarchical relationship between rule sets of said plurality of rule sets wherein:

(A1) each rule set of said plurality of rule sets includes rules for inferring a performance of a related component of said plurality of components; and (A2) for each pair, $R_1$ and $R_2$, of said rule sets, $R_1$ is a lower level rule set related to $R_2$ as a higher level rule set, when said related component for $R_1$ is a lower level component to said related component for $R_2$;

selecting, as a designated rule, an eligible rule from a current rule set of said plurality of the rule sets, when such an eligible rule exists, wherein said designated rule has a premise with a maximal number of predicates for evaluation using informational data items stored in a fact base;

evaluating said premise of said designated rule for determining a premise value;

performing, when said premise value is a predetermined value, a consequent of said designated rule for determining additional informational data items using said diagnostic data items, said performance of said consequent at least providing a result;

using said result for determining whether to add said additional informational data items to said fact base and for determining a new instantiation of said current rule set, wherein:

(B1) when Said result includes a first predetermined value, said new instantiation of said current rule set must be a predetermined eligible rule set that is at a lower level to said current rule set;

(B2) when said result includes a second predetermined value, said new instantiation of said current rule set must be an eligible rule set that is:
   (a) unrelated to said current rule set, and
   (b) is at a lower level than each previous instantiation of said current rule set;

setting said current rule set to ineligible for reconsideration as said current rule set;

repeating said steps of selecting, evaluating, performing, using, and setting until a rule cannot be selected for said designated rule;

stopping the analysis of the diagnostic data items output by components of the device; and outputting an analysis related to a performance of the device using information from performing a consequent of at least one rule selected as said designated rule.

2. A method, as claimed in claim 1, wherein:

said step of establishing a hierarchical decomposition of a device includes establishing a functional decomposition of the device wherein a component of a lower level of said components performs a subfunction of a related component of a higher level of said components.

3. A method, as claimed in claim 1, wherein:

said step of storing includes:

(C1) providing one or more rules in a higher level rule set for use in diagnosing a fault in a related higher level component; and (C2) storing in said storage means one or more rules for each lower level rule set, each said lower level rule set for use in diagnosing a fault in a related lower level component.

4. A method, as claimed in claim 1, wherein:

the data items output by a higher component of a higher level of said components includes data used in detecting a fault in the higher component and for each lower component of a lower level of said components, the data items output by the lower component includes data used in detecting a fault in the lower component.

5. A method, as claimed in claim 1, wherein:

said step of storing a rule set hierarchy includes incorporating in said storage means a predetermined linkage for linking a first rule in a higher rule set of a higher level of said rule set hierarchy with a predetermined lower rule set of a lower level of said rule set hierarchy so that when said first rule is said designated rule and (B1) of claim 1 occurs, then said predetermined lower rule set becomes said current rule set.

6. A method, as claimed in claim 1, wherein:

said step of performing said consequent of said designated rule includes inputting to said fact base fact data having informational content provided by the informational data items output by a component related to said current rule set.

7. A method, as claimed in claim 1, wherein:

said step of performing includes examining said result obtained from performing said consequent so that said predetermined eligible rule set at a lower level to said current rule set is selected as a new instantiation of said current rule set when said result indicates successful performance of said consequent.

8. A method, as claimed in claim 1, wherein:

said consequent includes a query of data items output by the device.

9. A method, as claimed in claim 1, wherein said step of repeating includes a second performance of said step of selecting for selecting said designated rule from a first lower level rule set is determined as said new instantiation of said current rule, wherein each rule of said first lower level rule set used for analyzing data from a related first lower level component of said plurality of components, and wherein said second performance of selecting ceases to use said first lower rule set as said current rule set when one of the following occur:

(D1) a consequent of said designated rule performs successfully; and
(D2) all rules of said current rule set have been selected as said designated rule and condition (D1) has not occurred for any designated rule from said current rule set.

10. A method, as claimed in claim 9, wherein:

said step of repeating includes iteratively choosing a previously unchosen rule set at a same level as said current rule as said new instantiation of said current rule set whenever said condition (D2) occurs, said step of iteratively choosing continuing until one of (D1) occurs and all rule sets of said same level have been chosen.

11. A method, as claimed in claim 9, wherein:

said step of repeating includes iteratively choosing a next rule set from said plurality of rule sets as said new instantiation of said current rule set when:

(E1) said next rule set is further down said rule set hierarchy than said current rule set;
(E2) condition (D1) occurs;
(E3) said next rule set is hierarchically related to said current rule set according to said hierarchical relationship between said plurality of rule sets; and
(E4) said next rule set is predetermined, via said hierarchical relationship, to become said current rule set whenever condition (D1) occurs for said current rule set as presently instantiated.

12. A method, as claimed in claim 11, wherein:

said step of stopping includes terminating analysis of the data items output by the device when condition (D1) occurs and no said next rule set exists.

13. A method, as claimed in claim 1, wherein:

said step of outputting an analysis includes outputting one of:

(F1) said additional informational data items determined in said step of performing; and
(F2) a diagnosis of a fault on the device.

14. An expert system for analyzing data comprising:

fact storage means for storing data input to and updated by said expert system during an analysis of data;

rule storage means for storing a plurality of rules, each rule in said plurality of rules having a premise with one or more conditions for evaluation using data in said fact storage means and a consequent, for determining at least one of:

(A1) new data for said fact storage means;
(A2) a conclusion inferred from data residing in said fact storage means;

rule grouping means for grouping said plurality of rules in said rule storage means into a plurality of rule sets;

inferencing means for performing each of:

(B1) selecting a rule set from said plurality of rule sets as a current rule set, said current rule set to be used in analyzing data within said fact storage means;
(B2) selecting an eligible rule from said current rule set of as a designated rule wherein said designated rule is selected whose premise has a maximal number of said conditions among eligible rules in said current set;
(B3) evaluating a premise of said designated rule, and performing a consequent of said designated rule when a premise of said designated rule is satisfied by data in said fact storage means, thereby determining at least one of (A1) and (A2) when said consequent of said current rule performs successfully;

rule set relating means for relating a first rule set in said plurality of rule sets to one or more other rule sets in said plurality of rule sets so that each second rule set of said other rule sets is associated with a predetermined rule in said first rule set, wherein when:

(C1) said first rule set is selected as said current rule set in (B1);
(C2) a predetermined second rule set of said other rule sets is associated with said designated rule selected in (B2); and
(C3) said consequent of said designated rule performs successfully in (B3), then said second rule set must be selected as said current rule set in a further performance of (B1) through (B3) by said inferencing means and said first rule set is designated as ineligible for reconsideration as said current rule set;

means for outputting resultant data when at least one of said designated rules cannot be selected in (B2) and a current rule set cannot be selected in (B1), said resultant data providing information related to one of:

(D1) data stored in said fact storage means; and
(D2) a conclusion related to said analysis of data.

15. An expert system, as claimed in claim 14, wherein:

said analysis of data includes analyzing an error log for fault data so that a fault can be detected.

16. An expert system, as claimed in claim 14, wherein:

said fact storage means includes a fact base, said fact base used for storing data used in determining when said premise of said designated rule is satisfied in (B3), said fact base retaining substantially only data not satisfying the premise of said designated rule.

17. An expert system, as claimed in claim 14, wherein:

said rule grouping means includes for each rule set of said plurality of the rule sets a different identifier identifying the rule set, said identifier used in identifying each rule within the rule set.

18. An expert system, as claimed in claim 14, wherein:

said rule grouping means partitions said plurality of rules into rule sets such that substantially each rule of said plurality of rules is contained in a single rule set.

19. An expert system, as claimed in claim 14, wherein:

said rule set relating means includes a hierarchical partial ordering of said plurality of rule sets wherein said first rule set is a parent rule set of said one or more other rule sets.

20. An expert system, as claimed in claim 14, wherein:

said rule set relating means includes a mapping means such that, for each rule, R, of said first rule set, said mapping means provides a reference to a rule set, S, of said one or more other rule sets wherein when R becomes said designated rule and said consequent of said designated rule performs successfully, then said mapping is used in determining rule set S as a next instantiation of said current rule set.

21. An expert system, as claimed in claim 14, wherein:

said inferencing means includes a breadth search means for selecting said designated rule, said breadth search means iteratively selecting as said designated rule a previously unselected rule whose premise has a maximal number of conditions or predicates for matching the data in said fact storage means.

22. An expert system, as claimed in claim 14, wherein:

said inferencing means includes pattern matching means for determining when said premise of said designated rule is satisfied by data in said fact storage means, said pattern matching means matching one or more conditions or predicates of said premise with the data in said fact storage means.

* * * * *